United States Patent Office 3,468,623
Patented Sept. 23, 1969

3,468,623
DRY STABILIZED DITHIONITE COMPOSITIONS
Marina Adriana van Damme-van Weele, Hengelo, and Bernardus Gerardus Wienk, Oldenzaal, Netherlands, assignors to N.V. Koninklijke Nederlandsche Zoutindustrie, Hengelo, Netherlands, a corporation of the Netherlands
No Drawing. Filed Mar. 19, 1965, Ser. No. 441,313
Int. Cl. C01b *17/98*
U.S. Cl. 23—116   5 Claims

ABSTRACT OF THE DISCLOSURE

A dry composition comprising substantially sodium dithionite having admixed therewith a stabilizer for inhibiting the decomposition thereof, said stabilizer being at least one compound selected from the group consisting of suberic acid, azelaic acid, sebacic acid and sodium, potassium, magnesium, calcium and zinc salts of said acids.

---

This invention relates to dry compositions of the dithionate class having a reduced tendency of decomposing under the influence of air and moisture.

Sodium dithionite, often called sodium hydrosulfite, and related compounds are rather stable during storage if packed in sealed containers. However, when these products are coming into contact with air and moisture, decomposition occurs.

Several substances have been proposed as stabilizers, i.e. products which counteract the decomposition of dithionite in one way or the other. Thus, U.S. specifications 1,810,663 and 2,121,397 mention various groups of water-insoluble, film-forming products, with which dithionite particles may be coated so as to reduce the decomposing action of water and oxygen. British specification 695,375 suggests the use of liquid esters of alcohols having 5 or more carbon atoms, in particular diesters of dicarboxylic acids, as stabilizers.

In using any of these products, the liquid becomes turbid or even a noticeable amount of solid or liquid product is collecting at the surface of the solution when a dithionite composition protected by such a stabilizer is dissolved in water.

Of course, this disadvantage does not occur when using water-soluble stabilizers, for example, soda ash, sodium bicarbonate, borax and paraformaldehyde, mentioned in U.S. specification 2,516,321. To obtain a satisfactory stabilization, such products must be used in quantities in the order of 10% by weight, even when using a mixture of borax and paraformaldehyde, which according to the said U.S. specification gives the best results. In general, the addition of so great amounts of stabilizers is undesirable and for some uses even inadmissible.

It is an object of this invention to provide dry stabilized dithionite compositions which overcome the objections to the compositions proposed heretofore.

More specifically, an object of this invention is to provide dithionite compositions stabilized by relatively small amounts of stabilizers. Another object is to provide a stabilization of dithionite compositions by using a stabilizer which has an effective stabilizing action during storage without causing turbidity in an aqueous solution made by dissolving the stabilized composition.

These objects are attained by incorporating into dithionite compositions suberic acid (octanedioic acid), azelaic acid (nonanedioic acid), sebacic acid (decanedioic acid), a salt of these acids or a mixture of two or more of the said compounds as a stabilizer.

It has been found that only small amounts of these stabilizers have to be added to accomplish effective stabilization. Accordingly, aqueous solutions of dithionite compositions stabilized in accordance with this invention are entirely clear, notwithstanding the relatively small solubility of the acids and of several of their salts.

Usually, a stabilizer amount of about 0.1% by weight, based on the dithionite content of the composition, is sufficient and, generally, the use of amounts greater than 0.5% by weight does not lead to a further reduction of the decomposition during storage. Even when the acids or their salts are mixed in a solid form with the dithionite to be stabilized, normally such small amounts suffice, provided the stabilizer particles are rather fine, for example, in the order of 5 microns, and provided mixing is effective. However, to obtain a good distribution of the stabilizer over the dithionite composition, preferably, the stabilizer is applied in the form of a solution or is added in a stage of the dithionite production wherein a liquid is still present.

Given the extremely small amounts of stabilizer required for effective stabilization, generally in using a salt of the acids referred to hereinbefore the nature of the cations is immaterial. Thus, for example, in stabilizing sodium dithionite not only the acids and their sodium salts may be used as stabilizers, but also other salts, such as potassium, magnesium, calcium and zinc salts, without affecting the normal uses of the stabilized dithionite as a reducing agent, for instance, in aqueous bleaching baths.

As is the case with the known stabilizers, the compounds to be used according to this invention may not only be used for stabilizing products mainly consisting of dithionites, but also for stabilizing mixtures containing dithionite or formaldehydesulfoxylates and like condensation or conversion products of the dithionite class.

Examples of substances which may be used in admixture with dithionites, are agents having a sequestering capacity and/or enhancing stability of aqueous dithionite solutions, such as polyphosphates, soda ash and urea.

In practice, among the three acids mentioned hereinbefore, especially sebacic acid which is commercially available as a technical product, comes into consideration.

The invention will be further illustrated, but is not limited by the following examples.

EXAMPLE I

To a mass of anhydrous sodium dithionite crystals contained in a vacuum drier and still comprising about 10% by weight of an adhering alcoholic washing liquid, solid sebacic acid was added in an amount of 1 kg. per 1000 kgs. of dithionite. Thereafter, the mass was dried while stirring in the usual way.

In storing a sample of the stabilized dried product in contact with air at a temperature of 30° C. and at a relative humidity of 75%, it appeared that after 24 hours 14% of the dithionite originally present had decomposed, in comparison with 38% when testing a sample of a batch, to which no sebacic acid had been added but which otherwise had been treated in the same manner.

EXAMPLE II 0.1 gr. of zinc sebacate was intimately mixed with 100 grs. of anhydrous sodium dithionite. A storage test carried out at 30° C. and a relative humidity of 75% resulted into a decomposition of 13% of the stabilized dithionite in 24 hours. The percentage of decomposition of a quantity of dithionite serving as a blank was 35% in 24 hours.

What is claimed is:
1. A dry composition comprising substantially sodium dithionite having admixed therewith a stabilizer for inhibiting the decomposition thereof, said stabilizer being at least one compound selected from the group consist- ing of sebacic acid and sodium, potassium, magnesium, calcium and zinc salts of said acid.

2. A dry, reducing composition comprising substantially sodium dithionite as in claim 1, wherein the stabilizer is one of sebacic acid and zinc sebacate.

3. A process which comprises mixing a mass of anhydrous sodium dithionite crystals having an alcohol-containing aqueous liquid adhering thereto, with a stabilizer selected from the group consisting of sebacic acid and sodium, potassium, magnesium, calcium and zinc salts thereof, and drying the mixture.

4. The process of claim 3, wherein the stabilizer is one of sebacic acid and zinc sebacate.

5. The composition of claim 2, wherein the amount of stabilizer ranges from about 0.1% to 0.5% by weight.

References Cited

UNITED STATES PATENTS 3,054,658    9/1962    Franklin et al. _____ 23—116

OSCAR R. VERTIZ, Primary Examiner

E. C. THOMAS, Assistant Examiner

U.S. Cl. X.R.

252—188